Feb. 11, 1958   W. J. SCHIESER ET AL   2,822,577
INJECTION MOLDING MACHINE WITH WEIGH-FEEDER AND
PLUNGER POSITION CONTROL
Filed March 21, 1956   4 Sheets-Sheet 1

INVENTORS
WARREN J. SCHIESER
JOHN F. KELLEY
DONALD G. MARSHALL
BY
ATTORNEYS.

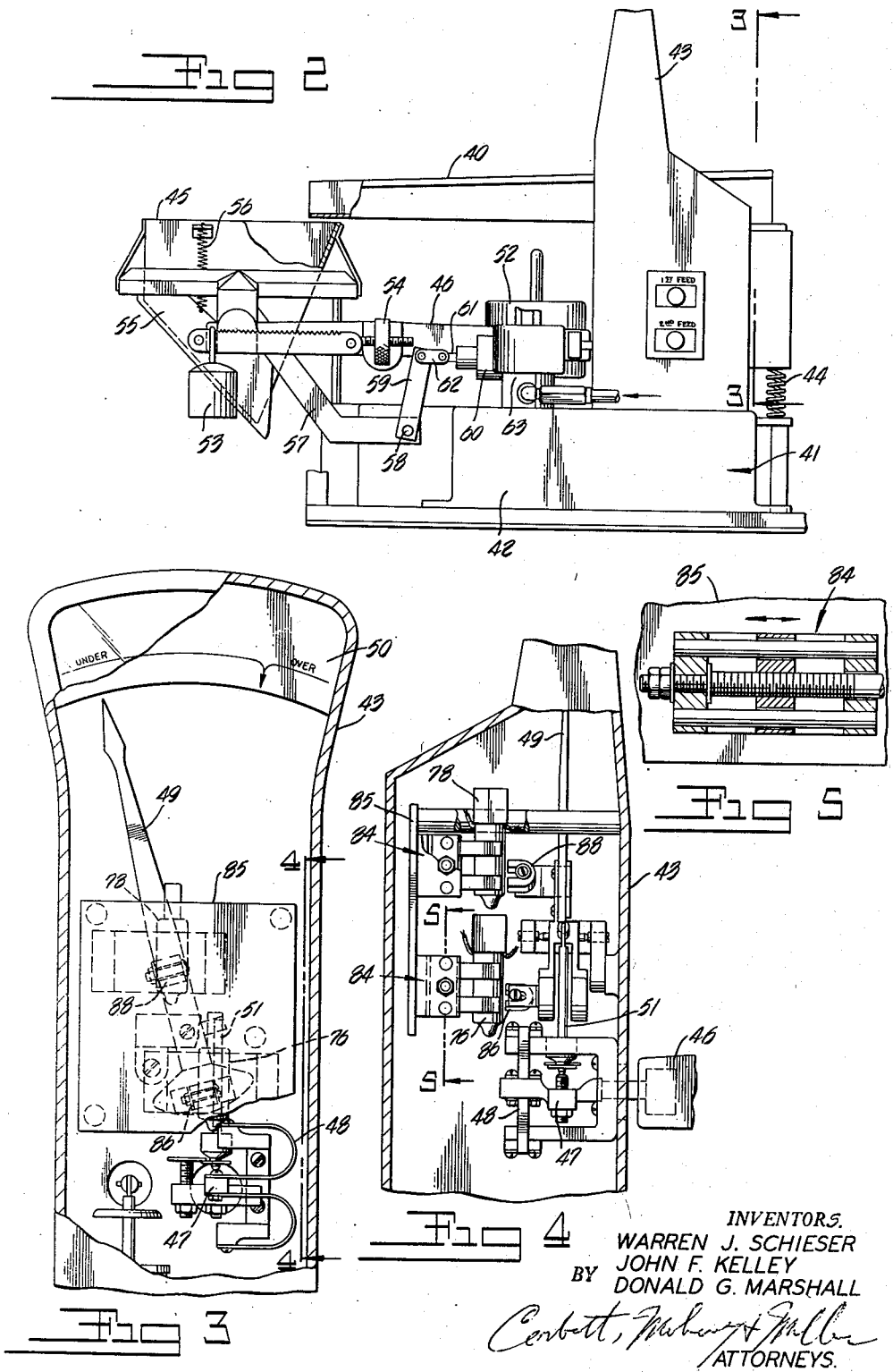

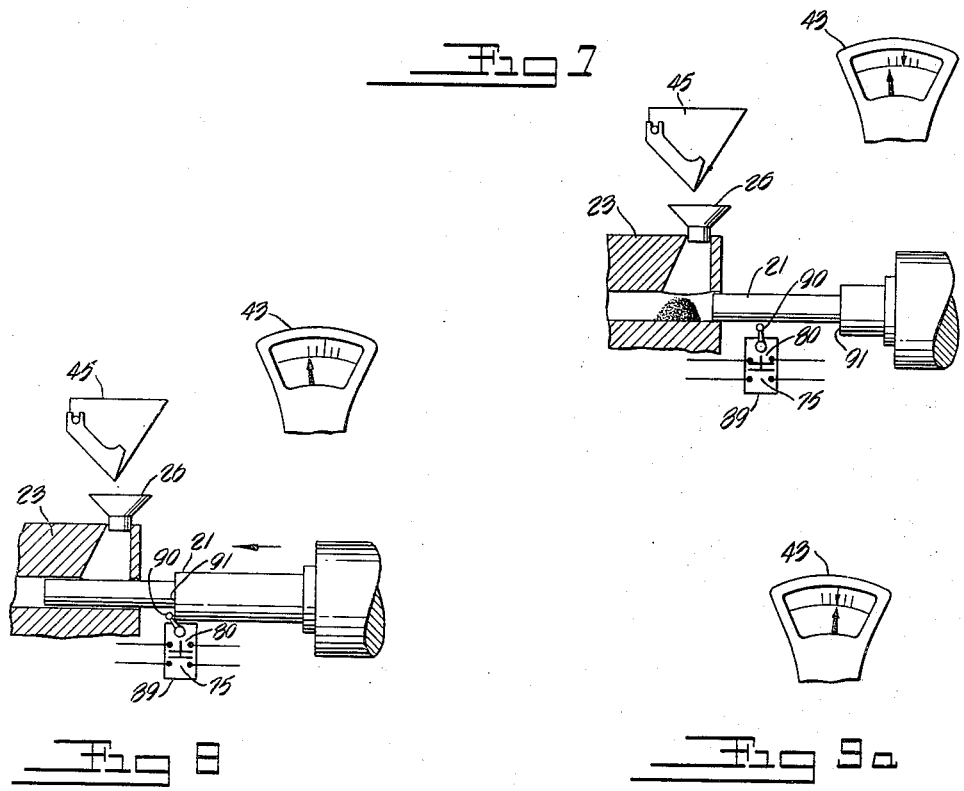
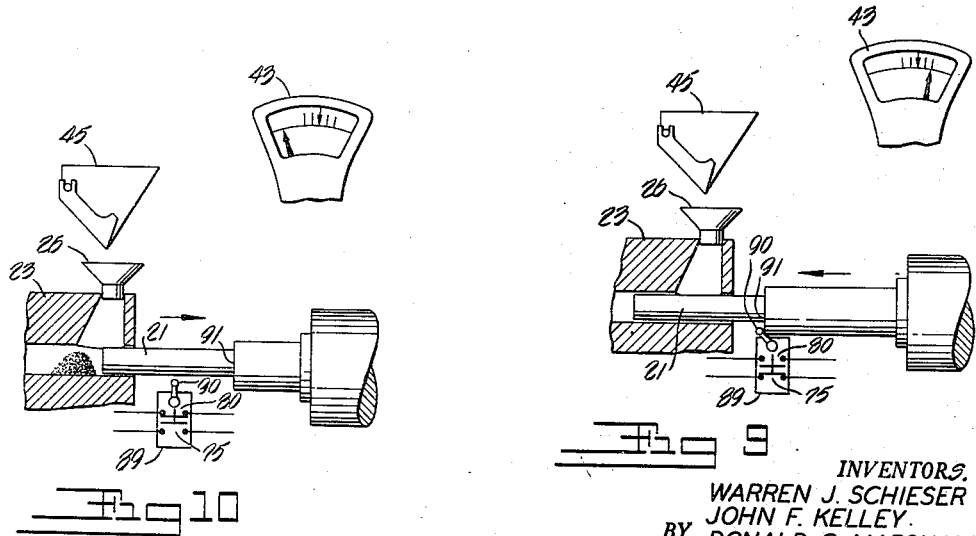

United States Patent Office 2,822,577
Patented Feb. 11, 1958

2,822,577

INJECTION MOLDING MACHINE WITH WEIGH-FEEDER AND PLUNGER POSITION CONTROL

Warren J. Schieser, John F. Kelley, and Donald G. Marshall, Columbus, Ohio, assignors to The Exact Weight Scale Company, Columbus, Ohio, a corporation of Ohio Application March 21, 1956, Serial No. 572,990

5 Claims. (Cl. 18—30)

Our invention relates to an injection molding machine with weigh-feeder and plunger position control. It has to do, more specifically, with an injection molding machine for molding plastic materials which is provided with a weigh-feeder that is automatically controlled by the injection molding apparatus of the machine, the weigh-feeder including a control system for automatically controlling the position of the molding machine plunger.

The practice of weigh-feeding the charge of plastic molding material to an injection molding machine has become widely accepted and several advantages over the previously-used system of volume-measuring the charge are realized. These advantages are outlined in various current scientific papers and in the patents to Schieser et al. Nos. 2,736,922 dated March 6, 1956, and 2,736,923 dated March 6, 1956.

With plastic injection molding machines used at present, generally speaking, the manner of injecting the shot or charge of plastic molding material into the die or mold is by one of two systems which are described as starved-feeding, or cushion-feeding the die or mold.

Starved-feeding may be described as the system in which the exact amount of plastic molding material required to fill the die or mold is fed to the molding machine feed chamber ahead of the ram of the machine. The ram, which is usually operated hydraulically, then forces the shot or charge into the die or mold via the plasicizer or heat chamber. In so doing, the ram operates to the limit of its stroke, the limit being determined by a mechanical stop. A ram operating in this manner is said to be bottoming.

Cushion-feeding differs from starved-feeding in that the ram does not bottom, due to an execess amount of molding material purposely provided ahead of the ram. The excess of the molding material cannot be forced into the die or mold and, therefore, serves as a cushion for the ram as it reaches the extent of its injection stroke.

Whether the ram of an injection molding machine is to be starved-fed or cushion-fed, depends upon many things, such as the type of plastic molding material being used, the type of die or mold, the type of press, and the judgment of the molder. It is quite generally agreed that, regardless of whether the die is starved-fed or cushion-fed, weigh-feeding an exact amount of plastic molding material to the feed chamber of the ram for subsequent feeding to the die is desirable, and in many cases essential, in order to maintain control of the ram to keep it bottoming when starved-feeding to the die or to maintain a uniform cushion ahead of the ram when cushion-feeding to the die.

It will be understood that if a charge of plastic molding material is delivered to the ram and is light in weight, this will cause a short shot, that is an unfilled die, or will cause a decreased cushion, depending upon the method of feeding the die. If the quantity of plastic molding material delivered to the ram is heavy in weight, it could prevent the ram from bottoming or increase the cushion to an undesirable extent, depending upon the method of feeding the die. The results of varying the charge of plastic molding material delivered to the ram might cause the above conditions to occur quickly or over a long period of time, depending upon the degree of error in each delivered charge, and other factors described below.

Factors, other than variation in the charge of the plastic molding material delivered to the ram, can cause improper bottoming of the ram or changes in size of the cushion. For example, these may be: variations in hydraulic pressure driving the ram; variations in temperature that would affect the degree of plasticizing of the material supplied to the ram and would alter resistance to flow of the material into the die; variations in the time cycle during which pressure is applied to the ram; and variations in overall cycle time caused by the operator.

Since the variables described above do exist, there was a need before development of the machines disclosed in said patents for a weigh-feeder in an injection molding machine which not only would weigh each charge and supply it to the ram but which would be automatically adjusted by operation of the ram to compensate for these variables so as to eliminate the undesirable effects on the ram position caused by all of the aforementioned variables. This need was more pronounced in the case of cushion-feeding but was present in the case of starved-feeding. The machines disclosed in said patents served this need but the present invention relates to an improved system whereby the position of the plunger is even more accurately controlled in accordance with the variables mentioned above.

A preferred embodiment of our invention is illustrated in the accompanying drawings wherein similar characters of reference designate corresponding parts and wherein:

Figure 2 is a side elevational view, partly broken away, of the weigh-feeder having the plunger position control system.

Figure 3 is a vertical sectional view through the indicator tower of the weighing scale of the weigh-feeder along line 3—3 of Figure 2 showing the switches which it controls.

Figure 4 is a vertical sectional view along line 4—4 of Figure 3.

Figure 5 is a vertical sectional view along line 5—5 of Figure 4.

Figures 7 to 10, inclusive, are diagrammatic views illustrating the sequence in operations of the weigh-feeder and plunger position control system.

Figure 1:
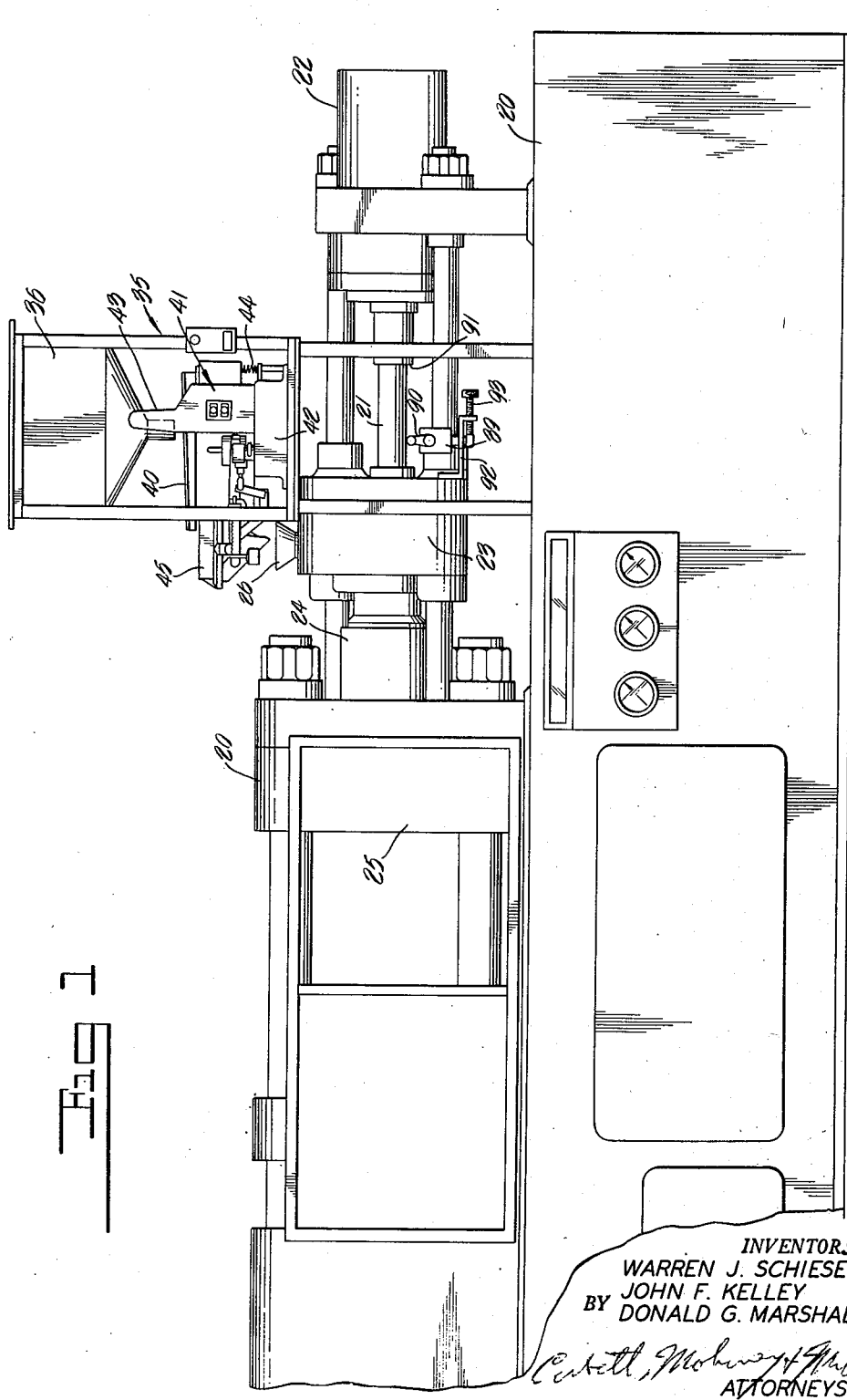
Figure 1 is a side elevational view illustrating an injection molding machine having a weigh-feeder and plunger position control system in accordance with our invention.

With reference to the drawings, in Figure 1 we have illustrated our invention embodied in an injection molding press of the horizontal type but it is to be understood that it could be embodied in a press of the vertical type. Our invention is not limited to any special make of press but is applicable to any press wherein there is provided a ram structure for injecting the molding material into the die or mold.

In the press shown in Figure 1, the press in general is indicated by the numeral 20. This press includes the plunger 21 which is operated by a hydraulic cylinder 22. In the injection or molding operation, the plunger 21 is moved forwardly through a feed section 23 and through a heating or plasticizing section 24, to force the plastic molding material ahead of it into a mold or die section 25. This section 25 will contain a suitable single cavity or set of die cavities into which the plunger 21 will force the plasticized molding charge which has been previously fed to the ram in granular form through an inlet funnel 26 on the feed section 23.

The plunger 21, when projected forwardly, will completely close the inlet slot leading from funnel 26 into section 23 after moving the previously supplied charge of material forwardly into the plasticizing chamber provided in section 24, where it is gradually heated and melted as it passes through this chamber and before it reaches one or more mold cavities in the section 25. When the plunger 21 is retracted rearwardly to the limit of its movement, the forward end of the plunger will be behind the inlet slot and a charge of material, previously dumped into the funnel 26, can then drop in front of the plunger for subsequent forward movement through the feed chamber, the plasticizing chamber, and into the die cavity or cavities. It will be noted that the press 20 is so constructed that a portion of the plunger 21 lying between the cylinder 22 and the feed section 23 of the press is always exposed.

For automatically supplying successive charges of the plastic molding material to the funnel 26, we provide the weigh-feeder 35. This weigh-feeder 35 is supported by a suitable vertical framework which is attached to the frame of the press 20 in such a location that the weigh-feeder will feed successively weighed charges of material into the funnel 26. This weigh-feeder in its general structure is substantially the same as that disclosed in the copending application of Schieser et al., Serial No. 553,596, filed December 16, 1955.

This weigh-feeder receives material from a vibratory feeder 40 which is of the well-known electromagnetically operated type and which, in turn, receives material from a hopper 36. However, it may receive material from any other suitable feeding mechanism. Associated with the feeder 40 is a scale 41. The scale 41 includes the base 42 and an upstanding indicator tower 43 which is disposed at the right-hand end of the base (Figure 2) and the dial of which (not shown) is readable from that end. The vibratory feeder 40 is suitably supported on a base adjacent the scale by means of springs, one of which is shown at 44. The tower 43 is offset forwardly (Figure 2) on the scale base to permit the trough of the feeder 40 to be disposed at a low level so that its discharge end is directly over a weigh bucket 45 which is provided at the end of the scale opposite to that where the tower 43 is disposed.

The scale 41 has fulcrumed on the base thereof a weigh-lever 46 which is shown as being of the one-to-one ratio type but may be of other suitable types. This lever 46 extends behind the indicator tower 43 and has an extension 47 (Figures 3 and 4) which extends forwardly into the indicator tower 43 and which has flexes 48 associated therewith which normally keep the lever in balanced position. An indicator pointer 49 of the pendulum type is provided for swinging movement in the tower in association with an over-and-under weight dial 50 and is connected to the weigh-lever extension 47 by means of a gravity type push rod 51 of a suitable type.

The weigh bucket 45 is disposed at the commodity end of the weigh-lever 46 directly over the funnel 26. The end of the weigh-lever 46 opposite to the bucket-supporting end has the counterbalance weight outrider 52 pivotally mounted thereon for counterbalancing the weight of the bucket 45 and associated parts. The lever 46 also has adjustably mounted on the front thereof a counterpoise weight 53 and a balancing weight 54.

The bucket 45 is of hopper form (Figures 1 and 2) and has a lower outwardly directed open end. For closing this lower outwardly directed open end of the bucket 45 we provide a gate 55. This gate is trough-shaped and is mounted for vertical swinging movement from closed position, in straddling relationship to the lower portions of the front and rear bucket walls to open position or dumping position where it is swung outwardly away from the bucket walls. The gate 55 is normally held in its upper-most or bucket-closing position by means of a pair of tension springs 56, one of which is shown in Figure 2, which have their lower ends anchored to the gate 55 and their upper ends anchored to the front and rear walls of the bucket.

For opening and closing the gate 55, we provide the operating mechanism shown in Figures 1 and 2, none of which is carried by live elements of the scale and, therefore, the gate-operating mechanism has no deleterious effect on the scale during the weighing operation and does not interfere with the accuracy of such operation. This operating mechanism only engages the gate when it is desired to move it into dumping position.

This operating mechanism comprises a pair of operating arms 57 provided at the front and rear of the bucket 45, one of which is shown in Figure 2, and which are operatively connected to the gate as disclosed in said copending application Serial No. 553,596. The arms 57 project downwardly and laterally of the bucket 45 and have their ends keyed on a rock-shaft 58 (Figure 2) which extends forwardly and rearwardly beneath the weigh-lever 46. This rock-shaft is rocked by means of a rock-arm 59 keyed on the forward end thereof.

The rock-arm 59 is rocked at the proper periods by means of an air-operated, cylinder and piston unit 60 (Figures 1 and 2) which is carried on the base 42 of the scale as shown in Figure 1. The piston rod 61 of this unit is connected to the upper end of the rock-arm 59 by means of a link 62. The unit 60 is controlled to open and close the gate 55 by an electromagnetically operated air valve 63 which operates in the manner disclosed in Serial No. 553,596.

With this arrangement of air-operated cylinder and piston unit 60, and air valve 63 for controlling the opening and closing of the gate 55, precise control over the gate is accomplished. Before the valve 63 is operated by a proper supply of electric current thereto, the gate 55 is in closed position. However, as soon as the valve 63 is actuated, the piston rod 61 is moved to the left and the arm 59 is rocked to the left about the axis of the shaft 58. This causes the arms 57 to swing down and swing the gate 55 downwardly against the force of the springs 56, thereby discharging the contents of the bucket 45 which has been previously weighed, and the arms will hold the scale lever down in overweight condition to prevent the feed of material from starting again for a selected period, as will later appear. The air cylinder and piston unit 60 will operate to swing the arms 57 smoothly without shock and the speed of movement of the unit 60 can be adjusted at will by means disclosed in Serial No. 553,596.

Figure 6:
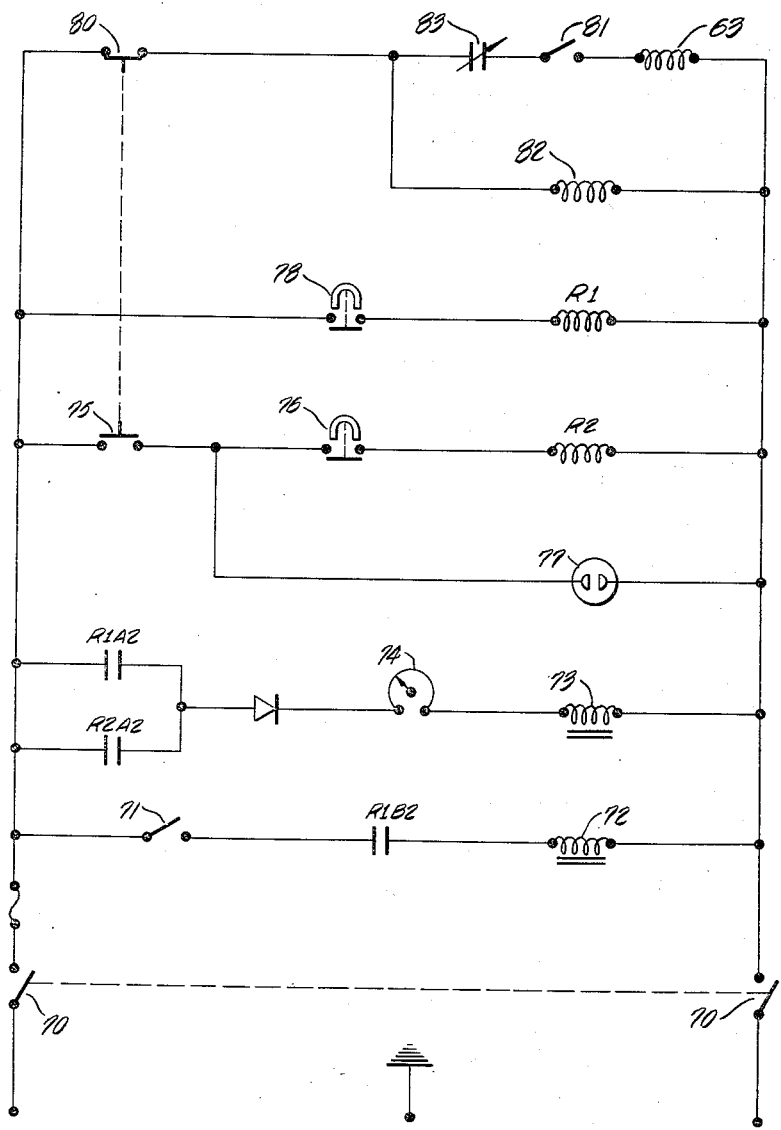
Figure 6 is a circuit diagram of the complete circuit for controlling the weigh-feeder and the plunger position control system.

In Figure 6, we have illustrated a circuit which can be used in controlling a weigh-feeder and associated plunger position control of the type indicated above.

The circuit includes a manual single throw double pole main switch 70 which controls the entire circuit. It also includes a single throw manual single pole switch 71 which controls a circuit to the hopper vibrator coil 72 of the means for vibrating the hopper 36 which is also controlled by the normally-open relay contacts R1B2. This hopper vibrating circuit need not be used, if not necessary, and can be rendered inoperative by opening the switch 71. A vibrator coil 73 of the vibratory feeder 40 is also connected in the circuit, a rheostat 74 being provided for varying the rate of feed. A normally open set of relay contacts R1A2 and a second set of normally open relay contacts R2A2 are connected in parallel in the circuit for controlling current flow to the coil 73. A limit switch 75, which is operated automatically in accordance with the position of the press plunger 21, controls what we term the second-feed circuit which includes a relay coil R2, that controls the set of relay contacts R2A2, and a mercury magnetic switch 76, which is operated automatically in accordance with the position of the indicator pointer 49. The limit switch 75 also controls a plunger position indicator light 77. What we term a first-feed circuit is also provided and includes a mercury magnetic switch 78, which is also controlled automatically in accordance with the position of the indicator pointer 49 which controls the relay coil R1 that actuates the set of normally open relay contacts R1A2. A dump switch 80 controls the circuit for the air valve 63 and is actuated automatically by the plunger 21 of the press, being normally closed with the plunger position control switch 75 in its normally open position. The air valve 63 is controlled by a time delay relay which includes the coil 82 and the normally closed contacts 83 which open at the end of a time delay interval. A manual switch 81 is also provided for closing or opening the dump circuit. Magnetic switches 76 and 78 are open when the indicator pointer 49 is at prescribed weight and are closed when it is in underweight position.

The switches 76 and 78 are disposed in the indicator tower 43, each being carried by a screw arrangement 84, one of which is shown in detail in Figure 5, for adjustment transversely of the tower, the screws being supported by a supporting plate 85 supported by the tower. Adjusting knobs are provided outside the tower as shown in Figures 1 and 2. Carried on the indicator pointer 49 are the two magnets 86 and 88 which cooperate with the respective lower and upper switches 76 and 78. These switches 76 and 78 are of the mercury magnetic type and are under the control of the respective magnets 86 and 88. The first-feed switch 78 is closed in the underweight position of the indicator 49 shown in Figure 3 and the second-feed switch is also closed in the underweight position of the indicator. The switches may be adjusted transversely of the indicator tower 43 to vary the instants when the switches are actuated in accordance with the swinging of the indicator pointer 49.

The dump switch 80 and the limit switch 75 are disposed in the same housing 89 which is associated with the ram 21 as shown in Figure 1. This combined switch is actuated by a trip lever 90 which is normally held in its rearwardmost position but which is engaged by a shoulder 91 on the plunger when the plunger moves forwardly sufficiently. Initial forward swinging of the lever 90 will open the dump switch 80 and continued forward movement of the lever will close the plunger position control limit switch 75. The housing 89 of the switch is mounted on a guide bracket 92 which is attached to the press section 23 and is adjustable on the bracket longitudinally of the press by means of the screw 93.

In setting up the machine for cushion feeding, the switch housing 89 is adjusted by the screw 93 to an exact predetermined position so that the plunger position control switch 75 carried therein, will close when the desired cushion is obtained in front of the plunger 21. The light 77 will aid in making this set-up since the circuit to it will be completed when the switch 75 is closed. With the machine set up in this manner and with the main switch 70 closed, the entire system will function in the following manner.

Assuming the plunger 21 to be retracted and the scale 41 to be unbalanced with the indicator pointer 49 in underweight position, the second-feed and first-feed switches 76 and 78 will be closed, the plunger position control switch 75 will be open, the dump switch 80 will be closed, the time delay relay contacts 83 will be open and the manual dump switch 81 will be closed, and the set of relay contacts R2A2 will be open but since the relay coil R1 is energized, the two sets of relay contacts R1A2 and R1B2 which it controls will be closed. If the circuit to the hopper vibrator 72 is to be used, the switch 71 will also be closed. Thus, at this time, the first-feed circuit will energize the coil of the vibratory feeder 73 and the hopper vibrator 72 if the latter is being used. A predetermined amount of material is thereby fed to the weigh bucket 45 under the control of the first-feed circuit. This first-feed will continue until the indicator pointer 49 approaches a predetermined underweight position, as shown in Figures 7 and 8 and as determined by the adjustment of the position of the switch 78 relative to the pointer 49, when the switch 78 will be opened and this first-feed circuit will be deenergized. The plunger 21 now advances, as indicated in Figure 9, forcing plastic material previously supplied by the weigh-feeder 40, into the mold. If the plunger advances far enough to close the limit switch 75, the second-feed circuit will be actuated since the relay coil R2 will be energized and will close the relay contacts R2A2 again completing the circuit to the vibrator coil 73 but not to the hopper vibrator coil 72 since the relay coil R1 will be deenergized at this time and the contacts R1B2 will be open. This second-feed circuit will supply additional material to the bucket 45 until the cut-off point of the switch 76 is reached, which is determined by the positioning of such switch relative to the pointer 49. This switch should be positioned so that the cut-off point is overweight as indicated in Figure 9 for cushion feed. When this method is used, material will never be delivered to the press in charges of exact weight for the part being formed but will always be over or underweight. This method insures that the plunger must travel to about the same position each stroke. If the plunger 21 starts to move toward bottom, the weight of the successive charge is increased and the cushion size is increased; however, if the cushion size tends to increase the weight of the successive charge is decreased and again the plunger 21 moves toward bottom. The variation in plunger position from one cycle to the next depends on the actual weight of material added by the second feed. The cut-off switches 76 and 78 should be set to cut off at the same relative positions, underweight and overweight, as indicated by a comparison of Figures 8 and 9.

A specific example of a scale setting is as follows:

If a part that weighs 12 oz. is being molded by the press and it is decided that ½ oz. of weight variation will take care of any variations in the molding press, the scale would be set to cut off on the first feed at 11¾ oz. The second feed would add ½ oz. and make the total weight 12¼ oz. With the feeder set as described above, the first feed would cut off at ¼ oz. underweight and the second feed would cut off at ¼ oz. overweight. The amount of weight variation that would be used to hold a cushion must be determined by the job being run. The variation must be enough to take in any weight variation that can be expected in the part being molded. However, the smaller the weight variation used, the more uniform the plunger position will be, and the more uniform the press cycle will be.

As the plungner 21 reaches its forwardmost position, as indicated in Figure 9, the dump circuit is still open. As the plunger moves back, as indicated in Figure 10, the contacts of dump switch 80 return to their normally closed position. This energizes the time delay relay coil 82 which opens the relay contacts 83 after the timer times out, so that the gate 55 is held open for a given amount of time and then closes, keeping the scale lever in overweight position, as previously indicated, and thereby delaying starting of the feed for a selected period. The indicator pointer 49 swings underweight when the dump circuit is deenergized and allows the switch 78 to close and the first-feed circuit to again energize the feeder coil 73.

For starve feedings, the cut-off point for the second-feed is set to exact weight position of the pointer 94 as shown in Figure 9a. As the plunger 21 moves into its bottom position the second-feed circuit is broken since the pointer 49 will be at exact weight. The other sequence of operations is the same as in cushion feeding except the plunger always bottoms and the cut-off of the second-feed is always when the pointer is at exact weight. If a cushion tends to build up, the additional feed circuit will not operate to thereby decrease the amount of the next charge so that the plunger will bottom, Thus, the weigh-feeder 35 will supply successive weighed charges to the press. The position of the plunger 21 will be controlled so that the proper cushion is maintained or the plunger bottoms. The plunger position system will be precise and will make possible the feeding of an exact amount of plastic required for a particular article being molded. Vibration of the press sometimes shakes the feeder 40, after the first-feed, so that additional material is supplied to the bucket. However, since the first-feed is set to cut-off underweight, this will not produce an inaccuracy in the charge because the second-feed will merely bring the charge up to the required amount. The second-feed occurs during the smooth part of the operating cycle of the press, that is, during injection, and will not be affected by vibration, and the bucket will be dumped immediately after the completion of the second-feed before any possibility of any additional material being accidentally added. The machine is not only more accurate but is easier to set up because the additional feed is based on actual weight and not a time period as in the machines of said patents.

Various other advantages will be apparent.

Having thus described our invention, what we claim is:

1. An injection molding machine having a plunger movable between injecting and non-injecting positions, a weigh feeder for weighing and supplying charges to the plunger, said weigh-feeder including weighing mechanism and material-feeding mechanism for feeding material thereto, a first control operatively connected to said material-feeding mechanism and actuated by said weighing mechanism for controlling said material-feeding mechanism to feed to said weighing mechanism an underweight charge of material, a second control operatively connected to said material-feeding mechanism and actuated by the plunger for controlling said material-feeding mechanism to feed an additional amount of material when needed to said charge being weighed by said weighing mechanism in accordance with the injecting position of said plunger to thereby control the position of the plunger in the next injecting operation when the charge being weighed is supplied thereto, means actuated by said weighing mechanism when it reaches requred weight condition for actuating said second control to control said material-feeding mechanism to cut off said additonal feed to said weighing mechanism, and means for supplying the charge weighed by said weighing mechanism to said plunger.

2. An injection molding machine having a plunger movable between injecting and non-injecting positions, a weigh-feeder for weighing and supplying charges to the plunger, said weigh-feeder including weighing mechanism and electrically operated material-feeding mechanism for feeding material thereto, electrcally operated first-control means comprising a first-feed switch acttuated by said weighing mechanism for controlling said material-feeding mechanism for causing said weigh-feeder to feed an underweight charge of material to the plunger, electrically operated second control means actuated by the plunger for causing said weigh-feeder to feed an additional amount of material when needed to a successive charge in accordance with the injecting position of said plunger to thereby control the position of the plunger in a successive injecting operation, said control means including a limit switch actuated by said plunger when it moves to a predetermined position in its injecting stroke to start the additional feed, and a cut-off switch actuated by said weighing mechanism when it reaches required weight position to interrupt said additional feed.

3. A machine according to claim 2 in which the weighing mechanism includes a movable weight indicator which actuates both of said switches.

4. A machine according to claim 3 in which the indicator is a movable pointer, each of said switches being magnetic switches actuated by the pointer.

5. A machine according to claim 4 including means for adjusting the cut-off point of each of said switches.

References Cited in the file of this patent

UNITED STATES PATENTS 2,760,232    Rougemont et al. _____ Aug. 28, 1956